United States Patent [19]
Lee

[11] Patent Number: 5,292,438
[45] Date of Patent: Mar. 8, 1994

[54] FILTRATION MEDIUM INCLUDING UNIFORMLY POROUS PLANAR SUBSTRATE AND UNIFORMLY SPACED APART THERMOPLASTIC RESIN

[75] Inventor: Charles A. Lee, Knoxville, Tenn.

[73] Assignee: Cer-Wat, Inc., Knoxville, Tenn.

[21] Appl. No.: 937,988

[22] Filed: Aug. 28, 1992

[51] Int. Cl.⁵ .............................................. B01D 39/16
[52] U.S. Cl. ................................... 210/504; 210/505; 210/508; 55/524
[58] Field of Search ............... 210/488, 489, 490, 506, 210/508, 504, 505; 55/524, DIG. 5, DIG. 42; 156/244.18, 252, 510

[56] References Cited

U.S. PATENT DOCUMENTS 3,919,369 11/1975 Holden .................................. 55/387
4,470,859 9/1984 Benezra et al. ...................... 210/506
5,089,075 2/1992 Sonoda ........................... 29/DIG. 47

*Primary Examiner*—Robert A. Dawson
*Assistant Examiner*—W. L. Walker
*Attorney, Agent, or Firm*—Luedeka, Hodges, Neely & Graham

[57] ABSTRACT

A novel filtration medium, preferably of the closed loop belt type, comprising a woven substrate which is overlaid by a disparate layer comprising a plurality of individual thermoplastic resin particulates which are controllably spaced apart from one another and bonded at fixed spaced apart locations to one to another and to the strands of the woven substrate. These resin particulates serve to define the pore structure and pore size for the medium. A method for the manufacture of the filtration medium is disclosed.

7 Claims, 2 Drawing Sheets

FILTRATION MEDIUM INCLUDING UNIFORMLY POROUS PLANAR SUBSTRATE AND UNIFORMLY SPACED APART THERMOPLASTIC RESIN

This invention relates to filtration media in general, and in particular to planar filtration media which comprise a substrate and one or more disparate layers overlaid thereon, such layer or layers serving to alter and/or adjust the filtration capabilities of the media.

In the prior art, filtration media have included many variations of planar substrates, such as screens, which have openings or pores through the thickness of the substrate through which there will pass one or more of the components of a mixture of materials that is deposited on the medium. These filtration media must provide the physical support required of the medium when a mixture of materials to be separated is deposited on one of the planar surfaces of the medium and one or more of the components of the mixture is caused to flow through the open passageways defined between the opposite planar surfaces of the medium. Application of pressure or vacuum may be used to enhance the rate of filtration and thereby further subject the medium to forces that tend to distort the screen, to increase the rate of wear of the screen, and to contribute to clogging of the openings through the screen. For physical support, at times it is required that the substrate be relatively massive and accordingly will define only gross, i.e. relatively large, open passageways through the thickness of the medium. It has been proposed heretofore that additional layers of filtration medium (e.g. additional screens), each having progressively smaller average sizes of open passageways through their respective thicknesses (termed "pores" in many instances), be overlaid onto the base filtration medium so that the end result is a composite filtration medium which has a combination of average pore sizes that has enhanced capability to perform the desired separation and which better withstands the wear and other forces that tend to distort and/or destroy a filtration medium during use.

Among the problems of the composite or multi-layered filtration media of the prior art are the difficulty of adding to a substrate one or more of the desired additional layers in a manner which provides uniformity of filtration, which provides continued retention of the added layer or layers on the substrate during use of the medium, which permits the medium to be used throughout a range of operating temperatures (particularly relatively high temperatures), and which does not result in inordinate clogging of the medium during use. Further problems associated with the prior art composite filtration media are the cost of manufacture of the medium and the useful life of the medium.

Further prior art filtration medium include tubular filters wherein the wall of the tube is porous and liquid from a liquid-solid mixture flowing through the tube is caused to preferentially pass through the pores in the tube wall while the solids continue to move along the length of the tube. Through recirculation, the solid content of the mixture is increased as desired. These tubular filters must either be inherently strong enough to contain the liquid-solid mixture under high pressure or be reinforced in some manner. Systems employing tubular filters generally require holding tanks and costly auxiliary handling equipment. Moreover, the cost of the filters themselves is substantial.

Still further attempts to provide the desired filtration medium have included the concept of applying a layer of mixed components, one of which is fugitive under specified conditions, onto a substrate, and thereafter removing the fugitive component to leave passageways through the medium at the locations where were originally occupied by the fugitive component. No successful system using this concept is known to exist. The problems with such proposed systems lies in the fact that there has not been developed heretofore any technique by which the desired passageways can be assured in the final product. Claims have been made in these prior art attempts to improved void volume of the medium, and to control over the distribution of the passageways throughout the medium, but the products of this prior art still suffer from lack of definition of the geometry of the passageways (pores) through the thickness of the medium and the lack of control over the size of the individual passageways. These shortcomings of this prior art results in filtration media in which the passageways are quickly blocked (clogged) by solid particles captured therein and/or by solid particles which bridge the openings to the passageways and effectively block the flow of liquid therethrough.

It is an object of the present invention to provide an improved composite filtration medium.

It is another object of the present invention to provide a composite filtration medium having a relatively long use life.

Other objects and advantages of the present invention will be recognized from the following description and claims, including the drawings in which:

Figure 1:
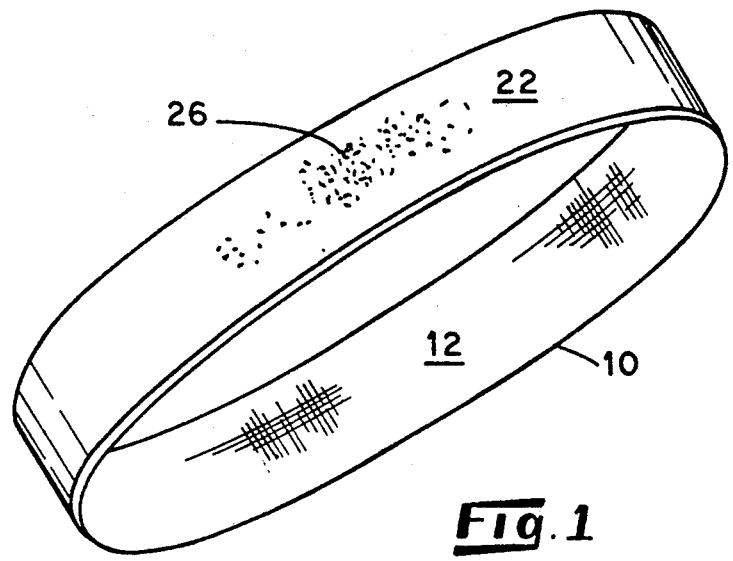
FIG. 1 is a schematic representation of a composite filtration medium embodying various of the features of the present invention.

In accordance with the present invention, the inventor has found that an improved composite filtration medium is obtained through the combination of a screen, preferably woven, substrate which provides basic physical support properties to the medium, and an overlying layer which comprises particulates of a thermoplastic resin wherein the resin particulates are controllably and substantially uniformity spaced apart from one another and bonded to one another, and/or to the substrate at spaced apart locations to define an integrated layer on one of the flat surfaces of the substrate, and which further defines substantially uniformly sized openings through the thickness of the composite filtration medium. Unexpectedly, it was discovered that through the selection of the size and size distribution of the resin particulates prior to the application of the particulates to the substrate and through the fixation of the particulates to one another and to the substrate in their uniformly spaced apart relationships, it is possible to develop a layer on one of the planar surfaces of the substrate which has unusual ability to resist clogging of the medium during use, as well as good definition and control of the geometry and average size of the open passageways (pores) through the thickness of the medium, resulting in enhanced filtration properties of the medium. In particular, the individual resin particulates are of a size greater than the size of the interstices between the strands of the substrate so that the resin particulates cannot pass through these interstices, but not so large in size that they are incapable of defining therebetween pores which are uniformity distributed over the entire effective filtration surface of the medium and of a controllable size which preferably is in the micron range, e.g. 20 microns pore diameter.

In a preferred method for the manufacture of the present improved filtration medium, there is provided a woven substrate comprising strands selected to withstand the wear and tear associated with a filtration operation and to suitably define between the woven strands interstices which serve as passageways through which liquid can pass in the course of the filtration operation. A selected combination of particulates of a fugitive material, such as calcium carbonate, and particulates of a thermoplastic resin are admixed and overlaid in a uniformly thick and relatively closely packed, layer onto the substrate. As noted hereinabove, the size of the individual resin particulates is chosen such that these particulates do not readily, and preferably none at all, will pass through the interstices between the strands of the substrate. Additionally, the size of the resin particulates is not to be greater than required to effect spaced apart bonding locations between ones of the resin particulates and the strands of the substrate. The size of the individual particulates of calcium carbonate, on the other hand, are chosen to be substantially smaller in size than the resin particulates and, further, smaller in size by several orders of magnitude than the desired final pore diameter to be developed within the medium. Their functions include establishing and maintaining positioning of the resin particulates in spaced apart relationship to one another, except at limited locations where the resin particulates are in physical contact or proximity to one another, during certain steps of the manufacture of the composite filtration medium. A further layer of only calcium carbonate particulates sufficient to form a thermal blanket on top of the layer of mixed particulates is provided on the mixed layer.

This layered combination of a substrate and mixed particulates is thereafter heated by means of heat applied only from that side of the substrate which is free of the particulate layer, whereupon the resin particulates are caused to be heated to at least their glass transition temperature, $T_g$, and, upon cooling below their glass transition temperature, to bond to each other at those locations where they are permitted, by the calcium carbonate particulates that separate the resin particulates, to be contact with, or in close proximity to, one another and/or with the substrate, and to bond to the strands of the substrate. Thereafter, the composite is cooled to a temperature below the glass transition temperature of the resin, whereupon the resin solidifies and bonds the components into an integral composite. Following cooling of the composite, it is subjected to a leaching agent which is specific to the fugitive particulates, e.g. to the calcium carbonate, for the purpose of removing this fugitive material from the composite and thereby opening up passageways that extend through the thickness of the layer of bonded resin particulates to the interstices between the strands of the substrate. Most unexpectedly, the heated resin was found to not adversely block the permeability of the substrate. But rather, through the selection of the manufacturing parameters and the careful choice of particulates, both size and other physical characteristics such as their respective responses to heating, among other things, it was found that the particulate layer could be made to serve the multiple functions of spacing of the resin particulates relative to one another, and maintaining this spacing until the composite had become integrated and self-sustaining. These functions were found possible while simultaneously defining the desired permeability of the composite filtration medium.

As noted, in the manufacturing process, after the layer of mixed particulates is applied to one of the flat surfaces of the substrate, a further layer of fugitive material, i.e., calcium carbonate particulates, is overlaid onto the layer of mixed particulates to provide a thermal blanket over the layer of mixed particulates that aids in controlling the heating of the resin, to aid in retention of the particulates in position during heating of the composite, and to enhance the smoothness of the resultant resinous surface of the medium.

With reference to the several Figures, in a preferred embodiment of the filtration medium 10 of the present invention comprises a substrate 12 woven from a plurality of warp yarns 14 and weft yarns 16 which define therebetween a plurality of interstices 17. The weave pattern depicted in the figures is of the square type, but it is anticipated that any of several weave patterns may be employed in the formation of the substrate, such as for example, the complex weave patterns that are commonly employed in the manufacture of Fourdrinier wires for papermaking machines and the like. In any event, the substrate must be of a construction and of materials which will provide the required physical support properties for the filtration medium as are necessary for a particular use of the medium and which defines open passageways through its thickness which can serve as the basis upon which modifications may be imposed by means of the application thereon of one or more layers of disparate materials. In particular, the material of the substrate must have a glass transition temperature that is greater than that of the resin particulates. In one acceptable embodiment, the individual yarns 14 and 16 are of a polyester. The respective diametral dimensions of the warp and weft yarns may vary widely, depending upon the intended end use of the medium, and yarn diameters between about 0.005 and about 0.020 inch have been found acceptable. As noted above, complex weave patterns may be employed. In this latter instance, it is common to employ yarns of different diameters for the warp and weft yarns. Other acceptable weave patterns and materials of construction for suitable substrates are those forming fabrics well known in the papermaking industry such as complex weaves embodying fine mesh and coarse mesh "layers". These weaves may have, for example, 54×88 (CD×MD) mesh, or 77×77 mesh combined with a layer of 39×38 mesh and similar weaves.

The woven substrate functions principally as a support for the porous membrane which is the primary "active" filtration component of the composite. In this manner, the substrate may be made strong by choosing from any of a large number of weave patterns, by choosing relatively large strands for use in weaving the substrate, and by choosing strands of any material which is compatible with the mixture being separated and the operating parameters of the filtration process such as pressure, temperature and chemical composition of the mixture being separated. This provides a large measure of choices in the construction of the substrate and permits these choices to be in large part selected on the basis of economics. In the choice of material(s) of construction of the substrate, it is of importance that consideration be given to the ability of the chosen thermoplastic resin particulates of the added layer to be bondable to the substrate by the application of heat inasmuch as it is through this means that the thermoplastic resin particulates are secured to the substrate and effect a bond between the porous medium and the substrate.

As referred to hereinabove, a plurality of thermoplastic resin 18 particulates are bonded to one of the flat surfaces of the substrate. In the preferred embodiment, the resin particulates are substantially of uniform size and are spaced substantially uniformly apart from one another, and bonded in these separated positions, to define substantially uniformly passageways (pores) 20 through the thickness of the layer of resin particulates. These passageways are smaller in size than the interstices defined by the woven strands of the substrate. Suitable thermoplastic resins particulates may be of polyethylene, polypropylene, polyester or acrylic. In any event, the resin must be available in particulate form and preferably of substantially uniform particle size. The preferred particle size distribution for the resin particulates is relatively narrow. The specific particulate size of the individual particulates of the resin are in primary part dictated by the choice of substrate, in that the resin particulates preferably are of a size that will not readily, if at all, pass through the interstices between the strands of the substrate. By way of example, a substrate having interstices which have a diameter of about 0.03 inch will dictate resin particulates having a diameter of about 0.03 inch or larger. In this manner, the resin will not pass through the interstices of the substrate during the steps of manufacturing the present filtration medium. Preferably the size of the resin particulates is chosen to be at or near the minimum size of resin particulate which will not pass through the substrate interstices so as to minimize the quantity of resin at any given location on the surface of the substrate and thereby minimize potentially blocking of the interstices of the substrate when the resin is fused during the bonding operation. The preferred thermoplastic resin particulates employed in the present invention exhibit a glass transition temperature below about 150° C. As noted hereinabove, it is of importance that the glass transition temperature of the resin particulates, of the material of construction of the substrate, and of the fugitive material be considered together. In any event, the glass transition temperature of the resin particulates must be less than the glass transition temperature (or melting point or vaporization temperature) of the substrate and the fugitive material. Whereas it is recognized that volatilizable fugitive material might be employed, it is preferred that this fugitive material remain solid and present in the composite until the composite has been stabilized and is self-sustaining.

The preferred fugitive material of the present invention is precipitated calcium carbonate 28. This material is capable of withstanding the relatively high temperatures employed in heating the composite to the glass transition temperature of the resin particulates, remains in the composite as a solid until the composite has become self-sustaining, is relatively easy to remove from the composite, is incompressible under the conditions of manufacture of the composite hence serves well in spacing of the resin particulates in the layer deposited on the substrate, is chemically inert with respect to the polymers useful as substrate and resin particulate compositions, among other attributes. Importantly, the preferred calcium carbonate particulates are of uniform and small particle size, hence the preference for precipitated calcium carbonate. It will be recognized that other fugitive materials which exhibit substantially similar characteristics may be employed, such as magnesium carbonate or various salts. To be useful in the present invention, the fugitive material must be available in particulate form and of a substantially uniform particle size. The specific particle size is selected as a function of the size of the resin particulates (which in turn is a function of the size of the substrate interstices) and should be materially smaller in particle size than the particle size of the resin particulates so that the fugitive particulates are capable of being interspersed with the resin particulates to separate the resin particulates to that limited extent that at least a portion or portions of substantially each resin particulate will be disposed in contact with, or in close proximity to another resin particulate, or to a strand of the substrate. By this means, the present inventor provides for contiguity of the resin particulates of a nature such that when the resin particulates are heated to their glass transition temperature, and thereafter cooled to a temperature below their glass transition temperature, the resin particulates form the required bonding between themselves and to the substrate, while simultaneously not flowing to the extent that there is deleterious blocking of the passageways of the substrate or the absence of defined passageways through the thickness of the resinous layer upon removal of the fugitive material. It will be noted from FIGS. 2 and 3 that the resin tends to flow while heated and the particles tend to spread laterally slightly.

The quantity of fugitive particulates and the quantity of resin particulates that go to the make-up of the layer of these particulates disposed between the substrate and the porous membrane is primarily dependent upon the desired extent of separation of the resin particulates, hence the size of the pores that are to be developed through the thickness of the resinous layer. Reference to the examples provided herein below will provide one skilled in the art an understanding of acceptable quantities of various mixes of fugitive and resin particulates, hence an understanding of suitable spacing of the resin particulates under a given set of circumstances.

In accordance with a further aspect of the present invention, it is noted that contrary to the mechanism of filtration exhibited by conventional screen type filter media wherein capture of one of the components of the mixture being separated is effected by capture of such component in the tortuous passageways of the filtration medium, in the present invention, the combination of a woven substrate and a permeable resin particulate layer provided on one surface of the substrate as taught by the present inventor produces capture of such component on the outermost surface of the resinous layer, not within the pores of the medium. This mechanism reduces the tendency of the medium to clog due to the capture of material that lodges in the open passageways through the thickness of the filtration medium. By this means, the filtration medium of the present invention permits the rapid buildup of a filter cake (representing efficient filtration), provides for additional removal of liquid from the filter cake itself, and for enhanced ease of removal of the filter cake from the filtration medium.

Figure 2:
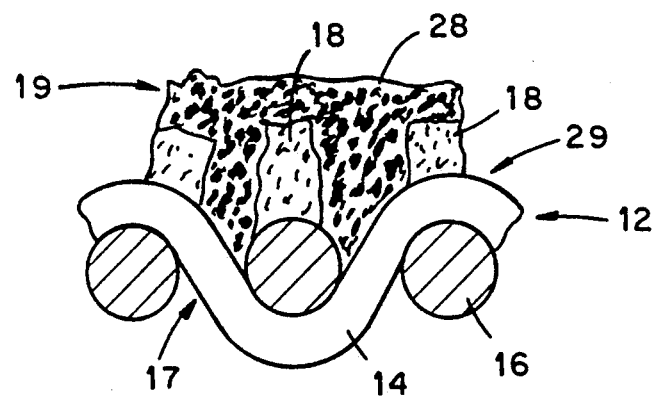
FIG. 2 is an enlarged schematic representation, in cross-section, of an unbonded lay-up of various components of a filtration medium and depicting various features of the invention.
Figure 3:
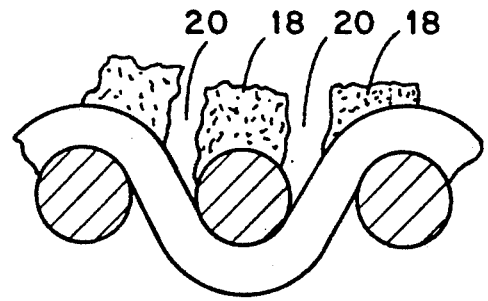
FIG. 3 is an enlarged schematic representation, in cross-section, as in FIG. 2, but depicting the components after removal of the fugitive component.

Again referring to figures, and particularly FIG. 2, in the depicted filtration medium 10, the substrate 12 is overlaid with a layer of resin particulates 18 disposed on one surface 29 of the substrate. Notably, the resin particulates are disposed at spaced apart locations and define therebetween a plurality of relatively open passageways 20 which extend through the thickness of the layer of resin particulates. Also of importance, the points or locations of contact between resin particulates and the surface 29 of the substrate are selectively limited by reason of the number and location of the individual resin particulates in the layer and their separation by the intermixed particulates of calcium carbonate. In this manner, the bonding of the membrane to the substrate is limited and there is minimal blocking by the resin particulates of the interstices between the strands of the substrate. On top of this layer of mixed particulates there is provided a further layer 19 of the calcium carbonate.

In a preferred method for the manufacture of a filtration medium in accordance with the present invention, an endless woven substrate is mounted about spaced apart rolls, one of which is driven as by an electric motor 3 which is connected in driving relationship to the roll as by a drive belt. Thereafter, the substrate is driven forwardly about these rolls and defines an upper run 38 thereof. A layer of uniformly mixed calcium carbonate particulates and resin particulates is dispensed onto the upper run 38 of the substrate. This composite is heated by the application of heat directed toward the innermost surface of the substrate so that the heat travels through the substrate before reaching the layer of particulates. This latter fact, in combination with the thermal blanket 19 of calcium carbonate serves to aid in the control of the heating of the resin particulates. During the heating stage, the resin particulates are heated to at least their glass transition temperature, and upon cooling in a subsequent stage of the process, fuse to one another where they are in contact, and to the strands of the substrate. As a final stage, the calcium carbonate particulates are leached from the composite, leaving open passageways between the adjacent resin particulates, these passageways extending though the thickness of the resinous layer.

In accordance with one aspect of the present invention, the average size of the pores through the thickness of the resinous layer is chosen to be less than the average size of the solid particles sought to be separated from a liquid carrier. In this manner, essentially none of the solid particles will enter the pores of the filtration medium. Due to the relatively "straight-through" nature of the pores of the resinous layer, any solid particle which manages to enter the pore will be swept on through the pore and will not become lodged within the pore and block the pore against the flow of liquid therethrough. By reason of the choice of particulate fugitive material, as opposed to elongated fibers, etc., the present inventor is able to combine the fugitive material with the resin particulates such that there are many fugitive particulates disposed between adjacent ones of the resin particulates. The quantity and size of these fugitive particulates, as well as their placement within the layer, effectively define both the location and the geometry of the pores that are developed through the thickness of the resinous layer that results on the surface of the substrate.

In FIG. 2, there is depicted a sectional representation of a substrate 12 onto which there has been deposited a layer of mixed calcium carbonate particulates 28 and resin particulates 18.

Figure 4:
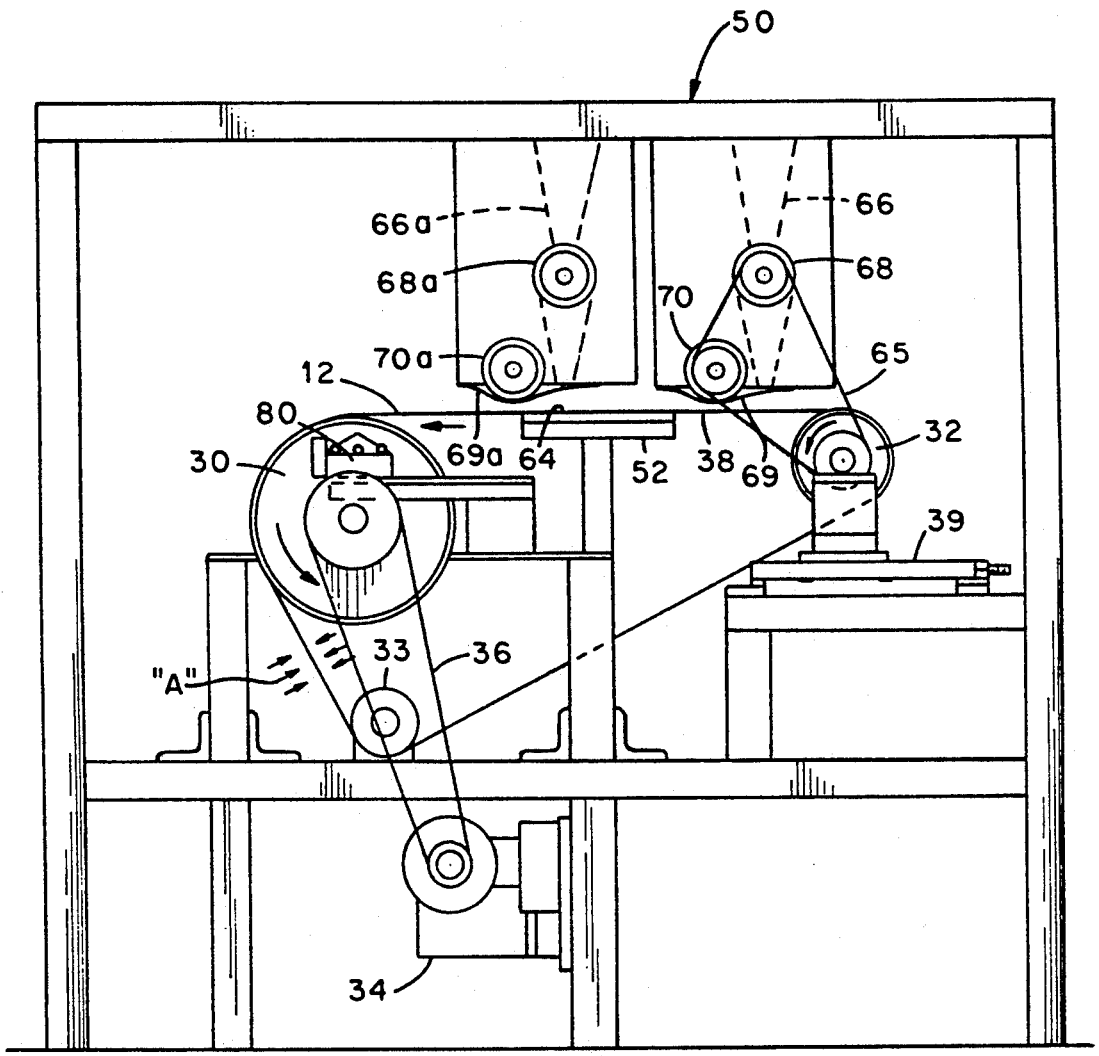
FIG. 4 is a side elevational view, partly diagrammatic, of an apparatus for use in the manufacture of a composite filtration medium in accordance with the present invention.

One embodiment of an apparatus for use in the manufacture of the novel filtration medium of the present invention is depicted in FIG. 4. With reference to this Figure, an endless woven substrate 12 is trained about a set of rolls 30, 32 and 33, roll 30 being driven as by a motor 35 drivingly coupled to the roll 30 as by a drive belt 36. Rolls 32 and 33 are idler rolls. As desired, roll 32 is mounted on a slide 39 which serves as an adjustment for the tension of the endless substrate on the rolls. The rolls, motor and other components of the apparatus are mounted within a frame, indicated generally by the numeral 50. A support plate 52 is mounted within the frame and beneath the upper run 38 of the substrate to provide support to the substrate as it moves along such upper run.

As the substrate 12 moves forwardly from the idler roll 32, there is first deposited on its upper surface 64 a layer of a mixture of calcium carbonate and thermoplastic resin particulates from a hopper 66. Within the hopper, the mixture of particulates is first dispensed by a grooved roll 68. The groove or grooves (not shown) in this roll 68 extend along the length of, and on the outer circumference of the roll and serve to receive therein portions of the particulate mixture. As the roll rotates, the individual portions of the mixture are dumped onto a screen 69 which is contacted by a rotating brush roll 70 to aid in dispensing a uniform layer of the particulate mixture onto the upper surface of the substrate. The rods 68 and 70 are rotatably driven by means of a belt 65 that connects these rolls to roll 32.

Following deposition of the first layer of mixed particulates onto the substrate, there is deposited onto such first layer, a second layer of only calcium carbonates particulates which are fed from a hopper 66a in measured quantity by a grooved roll 68a. The calcium carbonate particulates from the grooved roll fall onto a screen 69a which is contacted by a rotating brush roll 70a that serves to uniformly dispense the particulates onto the first layer. The grooved roll 68a and the brush roll 70a are rotatably driven by an appropriate drive belt system (not shown) similar to the belt 65 which is connected to the roll 32.

As shown in FIG. 4, the roll 30 is hollow and contains therein a heater 80 which serves to heat the circumferential shell of the roll. This heat is the source for heating the resin particulates to at least their glass transition temperature, such heating taking place while the composite comprising the substrate, the layer of particulates and the porous membrane are captured and held in intimate contact with the outer circumferential surface of the heated roll 30. In this manner, among other things, the degree of heating of the composite is controllable by the amount of heat applied, the speed of rotation of the roll 30 and the degree of wrap of the composite about the circumference of the roll 30. Upon completion of the desired heating, the composite is cooled to a temperature below the glass transition temperature of the resin particulates as by means of air jets (not shown) directed against the formed composite as it moves forward and leaves the roll 30.

In a preferred operation, the formation of the composite filtration medium is formed during one complete pass of the substrate through the apparatus. Removal of the calcium carbonate from the composite may be effected while the composite is still on the apparatus depicted in FIG. 4 by directing heated weak acid through the porous composite, or the composite may be removed from the forming apparatus and treated separately to remove the calcium carbonate. The depicted apparatus can be used to form an endless filtration medium of a specified size, or the formed composite may be removed and cut to a desired length and then rejoined at its ends to provide a different size (length) medium.

Employing the concepts of the present invention, the inventor has made filtration media from a variety of materials, each of which exhibits its own pore size, overall porosity, filtration capabilities, and related physical properties. By way of example, filtration media have been formed using substrates comprising complex woven fabrics such as that available from Huyck Corporation under the tradename Formex 324GX. This fabric includes cross-direction (CD) yarns having a diameter of 0.0197 inch. Two such yarns are essentially stacked atop the other, and separated at intervals by machine direction (MD) yarns of 0.0122 inch diameter. In the CD there also is provided a number of 0.0091 inch diameter yarns which extend in the CD and MD to serve, among other things, to interlock the fine and coarse mesh layers. In this fabric there are 54 openings per linear inch in the CD and 88 openings per linear inch in the MD. In this example, a mixture of calcium carbonate particulates and thermoplastic resin particulates was applied to one of the surfaces of the fabric. The calcium carbonate particulates of this example were themselves a mixture and comprised resin particulates of 200 microns and calcium particulates of between about 14 to about 40 microns thereby providing a good packing mixture. Approximately 0.75 grams per $in^2$ of this mixture of particulates was spread uniformly onto the substrate. The resin particulates were of polyester and exhibited a glass transition temperature of about 150° C. and bonded well to the substrate when the composite was heated to a temperature of about 150° C. in the manufacturing apparatus depicted in FIG. 4, and while entrained about the heated roll 30 traveling at a circumferential speed of 1.5 ft/min and with the composite in contact with the roll 30 over a distance of about 12 inches. A blanket layer between about 1/32 to 1/16 inch thick of the calcium carbonate particulates was overlaid on the layer of mixed particulates. The composite was entrained about a 16 inch diameter hollow roll which was heated internally such that the resin was uniformly heated to about 150° C. over an arcuate distance subtended by an angle of about 15°. Thereafter, the composite was cooled to solidify the resin, the calcium carbonate was leached away and the filtration medium product was collected. Examination of the formed filtration medium revealed that the porous membrane was securely bonded to the substrate at spaced apart locations that were uniformly spread over the area of the composite. No deleterious effect upon the overall porosity (permeability) of the substrate was noted, but rather the filtration medium exhibited uniform permeability over its entire coated surface area.

Notably, the filtration medium of the present invention may be formed as a continuous loop belt. By reason of the ability provided by the present invention of employing a woven substrate whose primary function is not the actual separation of components of a slurry of liquid and solids, but rather whose primary function is to provide support for the resinous layer, the present filtration medium resists frictional drag during its movement through a filtration system, is dimensionally stable and tough, and is both thermally and chemically stable. Further, the present medium is readily cleaned due to the absence of collection of the solids in the pores of the medium.

In accordance with one aspect of the present invention, the new filtration medium may be manufactured by repeated layering of a resin onto a woven substrate. In this manufacturing method, a first layer of resin particulates of a narrow particle size distribution and of a particle size which will not pass through the interstices between the strands of the woven substrate is overlaid onto one of the surfaces of the substrate. This resin-layered substrate is then passed through a heating step in which the resin particulates are heated to the point that the resin flows. The surface tension of the flowable resin with respect to the strands of the substrate causes the resin to gravitate to the strands, especially at the crossover locations of the woven strands, and to essentially coat each of the strands with resin. Upon solidification of the resin in this configuration, the solid resin partially fills the interstices between the strands and effectively reduces the size of the interstices, e.g., reduces the pore size of the openings through the woven substrate. This step of laying down resin particulates and thereafter heating the resin to cause it to flow onto the pre-existing resin-coated strands, is repeated as many times as desired with each repetition reducing the size of the interstices by a small amount, until the size of the interstices reaches that value desired for the particular use of the filtration medium. For example, starting with a woven substrate of square weave having interstices of about 200 microns between strands, a layer of resin particulates of at least about 200 microns diameter are overlaid onto the screen, heated to cause the resin to flow onto the strands and then cooled. This action may reduce the size of the interstices to about 100 microns. On the second pass, 100 micron particle size resin particles are employed. On this second pass the size of the interstices may be reduced to about 50 microns. On the third pass, 50 micron particle size resin particulates are employed, and so on until the size of the interstices are reduced to a desired value. Importantly, the quantity of resin particulates overlaid on the substrate during each pass is kept below that amount which will unduly block the interstices of the substrate, and preferably, many passes are employed so as to ensure control over the extent to which the interstices of the substrate are reduced in size in the course of each pass. Employing the apparatus of the present invention, many passes are easily and economically possible so that employing small quantities of resin particles, e.g., between about 0.3 to about 0.5 grams/$in^2$ of substrate area, during each pass is quite permissible without sacrificing time or cost in the manufacture of the filtration medium.

In this latter manufacturing technique, the final pass for reduction of the pore size of the substrate comprises the addition of a mixture of resin particulates and a fugitive material, e.g., calcium carbonate, plus the overlaying of a further layer of calcium carbonate particulates onto the exposed surface of the layer of the mixture. This second layer which comprises only calcium carbonate particulates is of a thickness which will provide a thermal blanket for retention of the heat of fusion for the resin particulates during that step when the resin is caused to flow and bond to the pre-existing resin-coated strands of the substrate. This blanket further serves to produce a smooth outermost surface of the resin which is deposited on, and bonded to, the substrate. As in the hereinabove described manufacturing procedure, the size and quantity of calcium carbonate particulates and the size and quantity of resin particulates employed in the resin/calcium carbonate mixture of this final pass are chosen to define the desired final size and geometry of the openings through the thickness of the resin-coated substrate. In this latter manufacturing procedure, however, the size of the resin particulates is chosen to be as small as between about 20 and about 40 microns. Following cooling of the coated substrate after the final pass, the fugitive material is removed, including the blanket, to expose the openings through the substrate. In a typical filtration medium manufactured in accordance with the present invention, it has been found possible to readily obtain pore sizes through the filtration medium as low as about 10 microns. The upper limit of the size of the pores through the filtration medium is a function of the size of the interstices of the woven substrate before the layering is begun. For practical purposes, pore sizes of the resin-coated woven substrate, filtration medium will not exceed about 200 microns.

I claim:

1. A filtration medium comprising a planar porous substrate means having first and second substantially planar opposite surfaces and which provides support for the medium and further defines a plurality of substantially uniformly sized open passageways between said opposite surfaces to define the gross filtration capacity of the medium, and a layer of discrete and substantially uniformly spaced-apart thermoplastic resin particulates of substantially uniform particle size overlaid on one of said surfaces of said substrate, said resin particulates being bonded at spaced apart locations to said substrate, the particle size of the particulates of said resin particulates being selected to controllably define structured open passageways through the layer of resin particulates and prevent their ready passage through the open passageways of said substrate means prior to their being bonded to said substrate.

2. The filtration medium of claim 1 wherein said resin particulates prior to becoming bonded of said substrate are of a particle size that is essentially equal to or greater than the size of the open passageways through said substrate whereby unbonded resin particulates will not readily pass through said open passageways.

3. The filtration medium of claim 1 wherein said thermoplastic resin is chosen from the class consisting of polyvinyl acetate, polyvinyl alcohol, polyurethane, polyester, polypropylene, polyethylene and acrylic.

4. The filtration medium of claim 1, wherein said openings through said substrate prior to the addition of said resin are about 100 times larger than the size of the openings defined by said resin after it has been bonded to said substrate.

5. The filtration medium of claim 1 wherein said substrate comprises a woven web of a thermoplastic resin.

6. The filtration medium of claim 5 wherein said substrate comprises woven polyester strands.

7. The filtration medium of claim 1 wherein the diametral dimension of open passageways defined by said resin particulates is between about 20 and about 200 microns.

* * * * *